Nov. 1, 1966     D. W. PETERSON     3,282,124
STEERING CONTROL ARRANGEMENT
Filed Nov. 22, 1963     2 Sheets-Sheet 1

INVENTOR.
Donald W. Peterson
BY Herbert Furman
ATTORNEY

Nov. 1, 1966 D. W. PETERSON 3,282,124

STEERING CONTROL ARRANGEMENT

Filed Nov. 22, 1963 2 Sheets-Sheet 2

INVENTOR.
Donald W. Peterson
BY Herbert Furman
ATTORNEY

United States Patent Office 3,282,124
Patented Nov. 1, 1966

3,282,124
STEERING CONTROL ARRANGEMENT
Donald W. Peterson, Fenton, Mich., assignor to General Motors Corporation, Detroit, Mich., a corporation of Delaware
Filed Nov. 22, 1963, Ser. No. 325,571
9 Claims. (Cl. 74—494)

This invention relates to steering control arrangements and more particularly to vehicle steering control arrangements.

One feature of this invention is that it provides an improved vehicle steering control arrangement which includes separate steering control means for each hand of the driver. Another feature of this invention is that it provides an improved vehicle steering control arrangement which permits the driver to select varying steering ratios. A further feature of this invention is that it provides an improved vehicle body steering control arrangement having separate control means for each hand of the driver, with the control means being operable in various manners to permit the driver to obtain various steering ratios. Yet another feature of this invention is that it provides an improved vehicle steering control arrangement having a pair of movable steering knobs, one for each of the driver's hands, and driven means connecting each of the knobs to the steering shaft and providing for the selection of varying steering ratios by the driver. Yet a further feature of this invention is to provide such a control arrangement wherein the knobs are movably supported on a console which in turn is supported on the steering shaft for movement independently thereof, with either of the knobs being movable independently of the console to provide a first steering ratio and with either of the knobs being movable with the console to provide a second steering ratio.

These and other features of this invention will be readily apparent from the following specification and drawings wherein.

Figure 1:
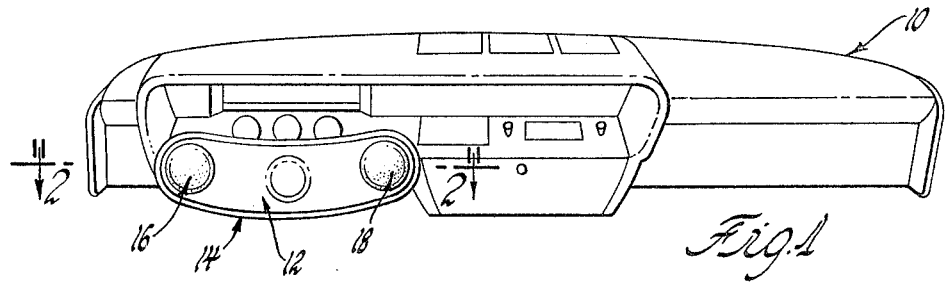
FIGURE 1 is an elevational view of a vehicle body instrument panel embodying a console steering arrangement according to this invention.

Referring now to FIGURE 1 of the drawings, a vehicle body, not shown, includes an instrument panel 10 which spans the driver's compartment of the body. A steering control arrangement 12 according to this invention is provided on the instrument panel 10 so that the driver or operator of the vehicle can steer the front dirigible road wheels of the vehicle. Generally, the control arrangement 12 includes a console 14 rotatably supported on the steering shaft, as will be described, and a pair of manually operable knobs 16 and 18 for the left and right hands of the driver or operator, respectively, so that he may operate the control arrangement.

Figure 2:
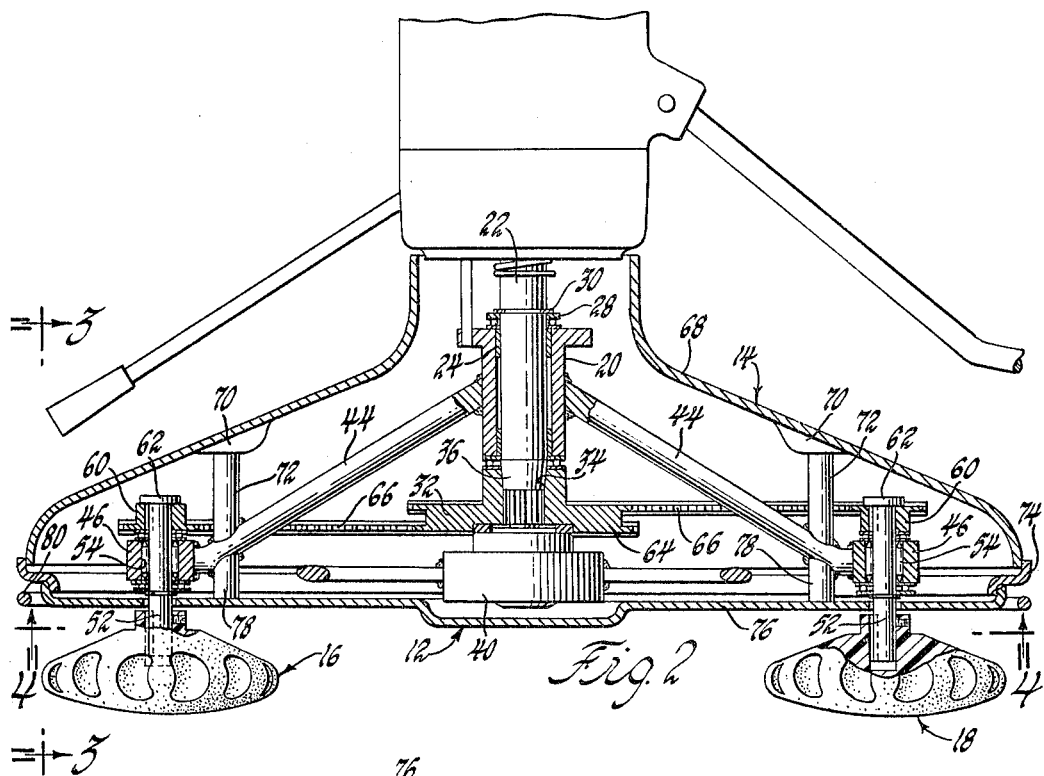
FIGURE 2 is an enlarged partially broken away view taken generally along the plane indicated by line 2—2 of FIGURE 1.
Figure 3:
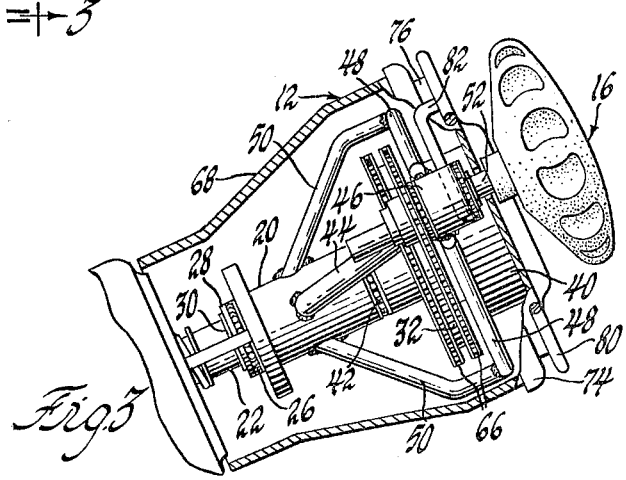
FIGURE 3 is a partially broken away view taken generally along the plane indicated by line 3—3 of FIGURE 2.
Figure 5:
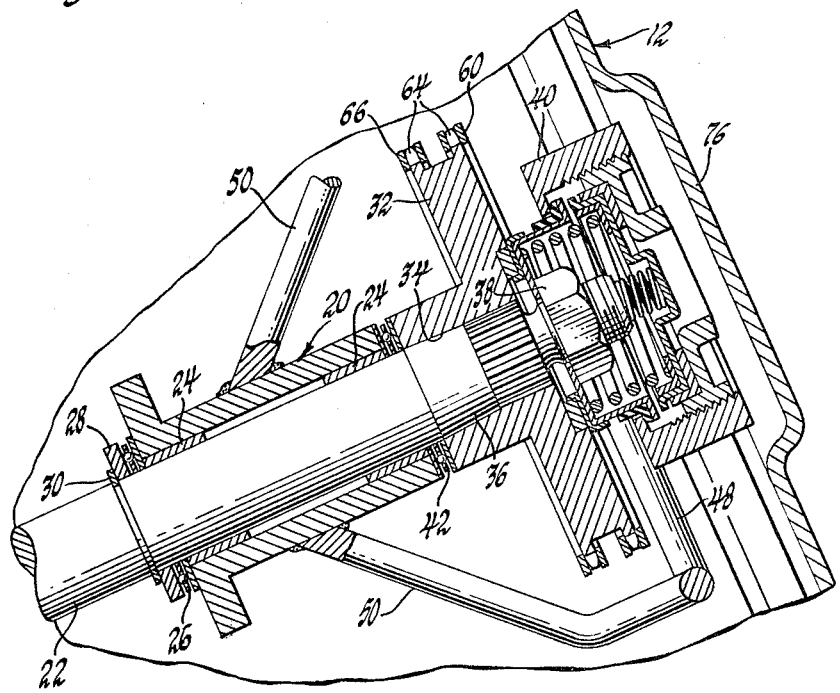
FIGURE 5 is an enlarged, partially broken away view of a portion of FIGURE 2.

Referring now particularly to FIGURES 2, 3 and 5 of the drawings, a flanged support member 20 is rotatably mounted on the steering shaft 22 adjacent the upper end thereof by bushings 24. A thrust bearing 26 is located between a washer 28 and the lower flanged end of the support member 20 to slidably locate the member 20 on the steering shaft 22. Washer 28 is located on the steering shaft by means of a split ring 30. A sprocket 32 includes an inner partially tapered and partially splined bore 34 which receives a complementary portion 36 of the steering shaft 22 in order to be fixedly secured thereto. Sprocket 32 is secured against axial displacement by a nut 38 on the upper threaded end of the steering shaft which also mounts a conventional horn switch 40 on the steering shaft. A thrust bearing 42 is located between the sprocket 32 and the support member 20.

Figure 4:
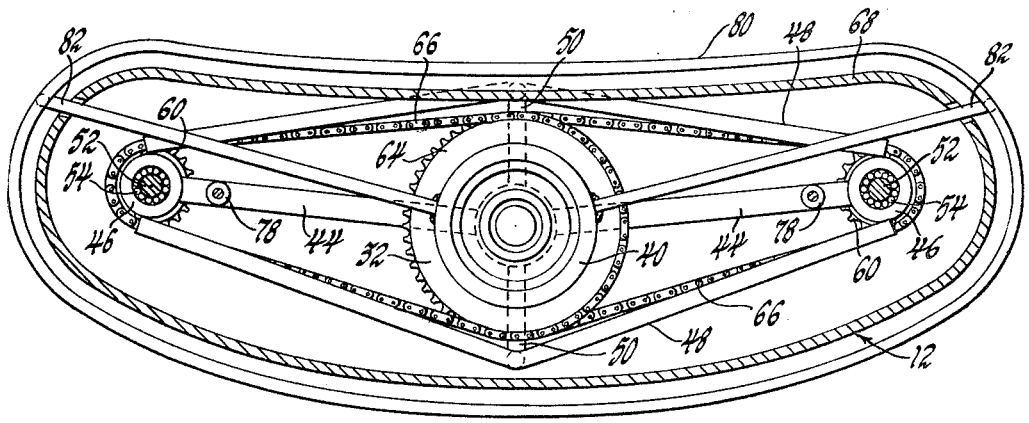
FIGURE 4 is a partially broken away view taken generally along the plane indicated by line 4—4 of FIGURE 2.

A pair of radiating arms 44 extend generally radially outwardly and upwardly of the body from the support member 20, with the outer generally laterally extending end portion of each arm being secured to a hub or support member 46. The members 46 are also interconnected by generally V-shaped arms 48, FIGURE 4, which extend therebetween and which have their intermediate or bight portions connected to the member 20 on diametrically opposite sides thereof by means of angular arms 50, FIGURE 3. Thus the hubs or support members 46 are located on diametrically opposite sides of the steering shaft 22 and are both braced and rotatably mounted on the steering shaft adjacent the upper end thereof.

A headed stub shaft 52 is rotatably supported in each of the members 46 by means of needle bearings 54, with a thrust bearing being provided between the upper edge of the member 46 and a spring clip secured to the shaft 52 and a like thrust bearing being provided between the lower edge of the member 46 and a sprocket 60 which is keyed to the shaft 52 and seats against the head 62 thereof. Each sprocket 60 is connected to an annular toothed portion 64 of the sprocket 32 by means of a suitable link drive chain 66. The knobs 16 and 18 are keyed to the upper ends of their respective shafts 48 and are located against axial displacement by suitable means such as a set screw as shown.

The console 14 includes a lower housing 68 which is secured to the arms 44 by means of screws extending through bosses 70 of the housing and into tapped columns 72 which are secured to each of the arms. The console also includes a flanged housing member 74 and an upper housing 76 which seats on the member 74 and is secured to the arms 44 by means of suitable screws extending into tapped columns 78 which are secured to each of the arms and extend oppositely to the columns 72. A horn ring 80 surrounds the housing 76 and is operatively secured to the horn switch 40 by spaced arms 82, FIGURE 4, which extend from the horn ring and through openings in the housing 76 and housing member 74.

If the driver or operator grasps either the knob 16 or the knob 18 or both and rotates the one knob or knobs in the same direction while maintaining the console 12 stationary with respect to the steering shaft 22, the drive chain 66 respective to the one knob or knobs will rotate the sprocket 64 and turn the steering shaft 22 at a preset reduction ratio, which in the specific embodiment shown, is a ratio of approximately 3:1 to thereby obtain one steering ratio. If the driver or operator grasps either knob 16 or 18 and rotates the console 12 with respect to the steering shaft 22, a planetary action results, with the reduction ratio between the shaft 22 and the console 12 being approximately 1½:1 in the specific embodiment shown to thereby obtain another steering ratio. If both of the knobs are slightly turned opposite to each other to maintain the knobs in a fixed position relative to the console 12, rotation of the console about the steering shaft 22 will produce a further steering ratio of approximately 1:1.

Thus, this invention provides an improved vehicle steering control arrangement.

I claim:
1. In a vehicle body having a steering shaft adapted to be connected to dirigible road wheels, a multiple ratio steering control arrangement wherein the steering ratio is selectable by the vehicle operator comprising in combination, support means movably mounted on said steering shaft, spaced control means movably mounted on said support means for movement therewith as a unit or movement relative thereto, means interconnecting each said control means and said shaft, movement of said control means and said support means as a unit providing a first steering ratio and movement of either of said control means relative to said support means providing a second steering ratio.

2. A steering control arrangement as set forth in claim 1 wherein simultaneous movement of said control means in the same direction relative to said support means will provide said second steering ratio.

3. In a vehicle body having a steering shaft adapted to be connected to dirigible road wheels, a multiple ratio steering control arrangement wherein the steering ratio is selectable by the vehicle operator comprising in combination, support means movably mounted on said steering shaft, spaced control means movably mounted on said support means for movement therewith as a unit or movement relative thereto, means interconnecting each said control means and said shaft, movement of said control means and said support means as a unit providing a first steering ratio, movement of either of said control means relative to said support means providing a second steering ratio, and simultaneous movement of said control means relative to said support means and movement of said support means relative to said steering shaft providing a third steering ratio.

4. In a vehicle body having a steering shaft adapted to be connected to dirigible road wheels, a multiple ratio steering control arrangement wherein the steering ratio is selectable by the vehicle operator comprising, in combination, support means mounted on said steering shaft for movement independently thereof, operating means mounted on said support means for movement therewith as a unit or movement independently thereof, drive means interconnecting said operating means and said shaft and rotating said shaft upon movement of said operating means independently of movement of said support means to provide a first reduction ratio therebetween, said drive means providing a second reduction ratio between said operating means and said shaft upon movement of said operating means as a unit with said support means.

5. In a vehicle body having a steering shaft adapted to be connected to dirigible road wheels, a multiple ratio steering control arrangement wherein the steering ratio is selectable by the vehicle operator comprising, in combination, support means rotatably mounted on said steering shaft for movement independently thereof, first gear means operatively secured to said shaft, second gear means rotatably mounted on said support means for movement therewith as a unit or movement independently thereof, and means interconnecting said first and second gear means, rotation of said second gear means independently of movement of said support means providing one reduction gear ratio between said first and second gear means, and movement of said second gear means as a unit with said support means providing a second reduction ratio between said first and second gear means.

6. A steering control arrangement as set forth in claim 5 wherein manual means are provided for rotating said second gear means independently of said support means or moving said second gear means therewith as a unit.

7. A steering control arrangement as set forth in claim 5 wherein spaced like second gear means are rotatably mounted on said support means and said interconnecting means interconnects each of said second gear means and said first gear means, each said second gear means being movable to provide said first reduction ratio between said first gear means and each of said second gear means, and said second gear means each being movable with said support means as a unit to provide said second ratio of reduction.

8. A steering control arrangement as set forth in claim 5 wherein said support means rotatably mounts a shaft, said second gear means is secured to said shaft for rotation therewith, and a manually operable knob is secured to said shaft to rotate said second gear means independently of said support means or rotate said second gear means and said support means as a unit.

9. A steering control arrangement as set forth in claim 5 wherein rotation of said second gear means in the same direction provides said one ratio and simultaneous rotation of said second gear means relative to said support means and rotation of said support means relative to said shaft provides a third reduction ratio.

References Cited by the Examiner
UNITED STATES PATENTS

| | | | |
|---|---|---|---|
| 2,507,600 | 5/1950 | Kaiser et al. | 74—494 |
| 2,746,698 | 5/1956 | Ross. | |
| 3,176,537 | 4/1965 | Zeigler | 74—492 |

FRED C. MATTERN, Jr., *Primary Examiner.*

BROUGHTON G. DURHAM, MILTON KAUFMAN,
*Examiners.*

C. F. GREEN, *Assistant Examiner.*